Aug. 17, 1965   E. W. YETTER   3,201,572
CONTROL METHOD AND APPARATUS
Filed May 8, 1961   5 Sheets-Sheet 1

INVENTOR.
EDWARD W. YETTER
BY Harry J. McCauley
ATTORNEY

INVENTOR.
EDWARD W. YETTER
BY Harry J. McCauley
ATTORNEY 3,201,572
CONTROL METHOD AND APPARATUS
Edward W. Yetter, West Chester, Pa., assignor to E. I. du Pont de Nemours and Company, Wilmington, Del., a corporation of Delaware
Filed May 8, 1961, Ser. No. 108,521
6 Claims. (Cl. 235—151)

This invention relates to an improved method and apparatus for control, and particularly to a method and apparatus simulating continuous control but employing repetitive sampling and functioning by the choice of one of a number of predetermined velocity pattern corrective actions adapted closest to obtain the desired control response within a preselected time interval.

Industrial processes are steadily increasing in complexity and therefore require more and more automatic control for their conduct. Resort has been had to computers as a control agency; however, effectuation of control responsive to the computer has been expensive to achieve since, when this control is accomplished by bringing a control element to a predetermined setting, position resolution of a precision of 1:1000 requires storage of at least 10 bits of information per valve. In addition, conventional control requires associated servo positioning equipment of at least 1:1000 precision. This aggregates to a very high cost of apparatus for every process point under control.

An object of this invention is to provide a control method and apparatus which requires much less information storage for the achievement of its objective than conventional controls and, in addition, dispenses entirely with position servos.

Figure 1:
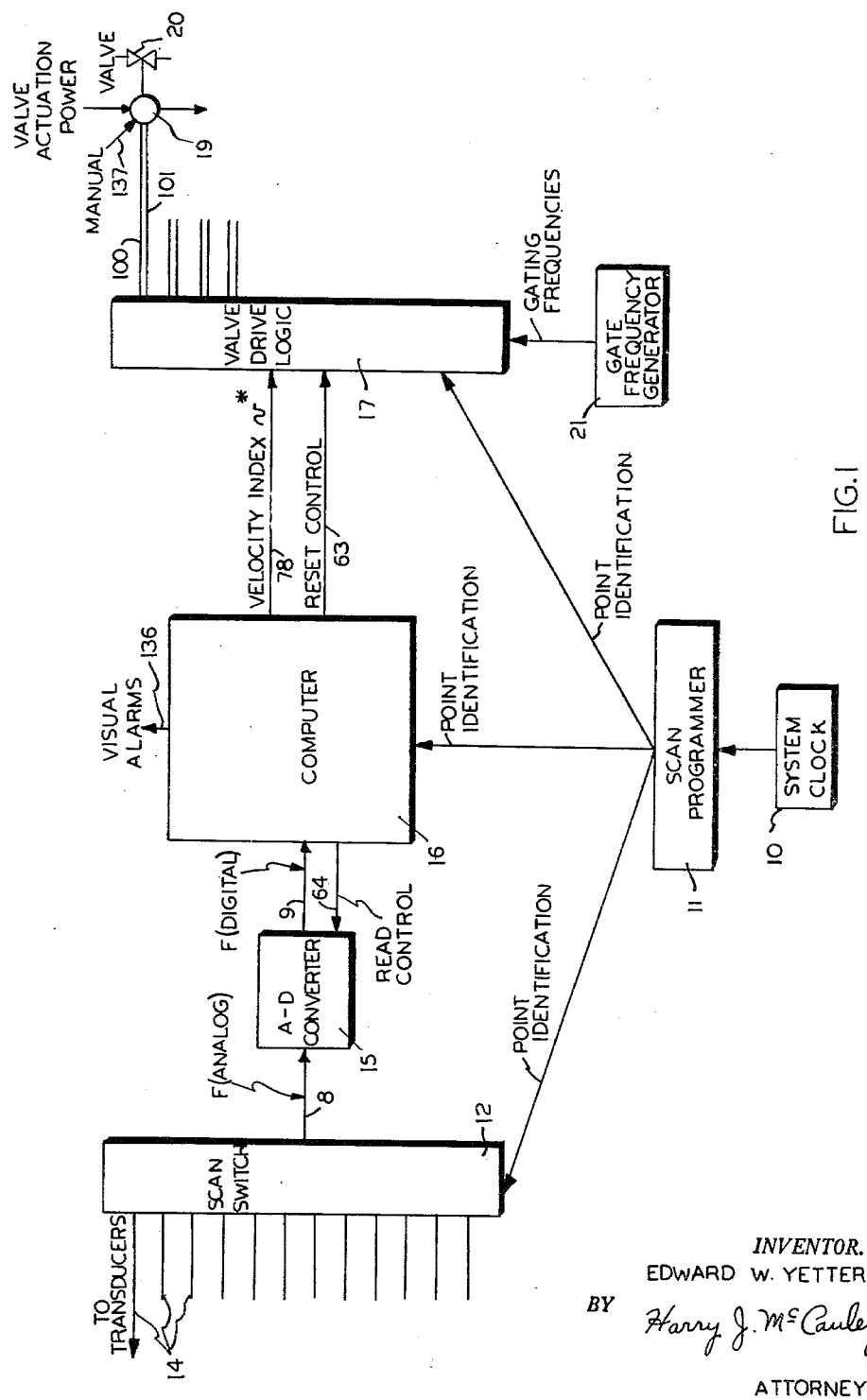
Figure 2:
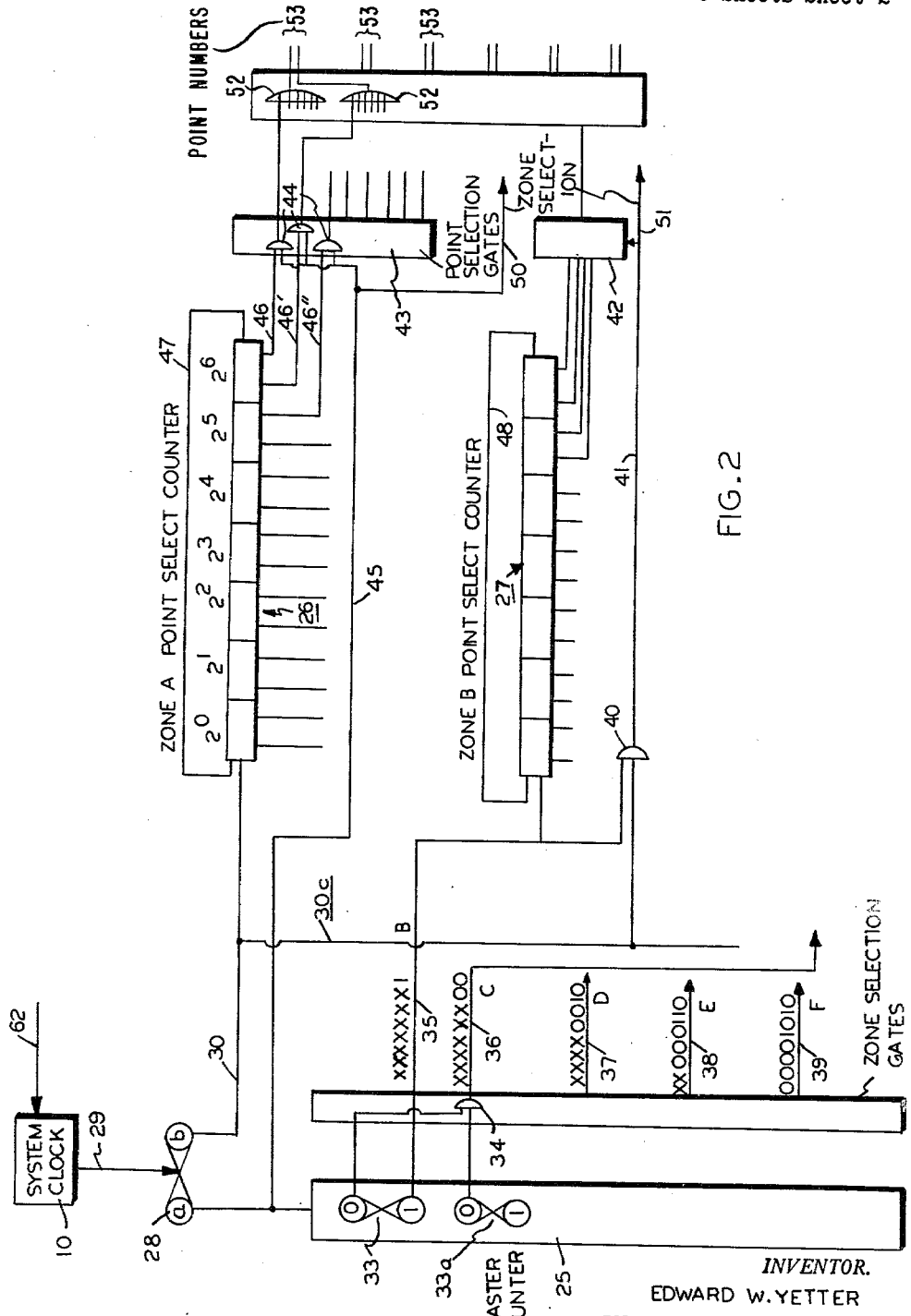
Figure 3:
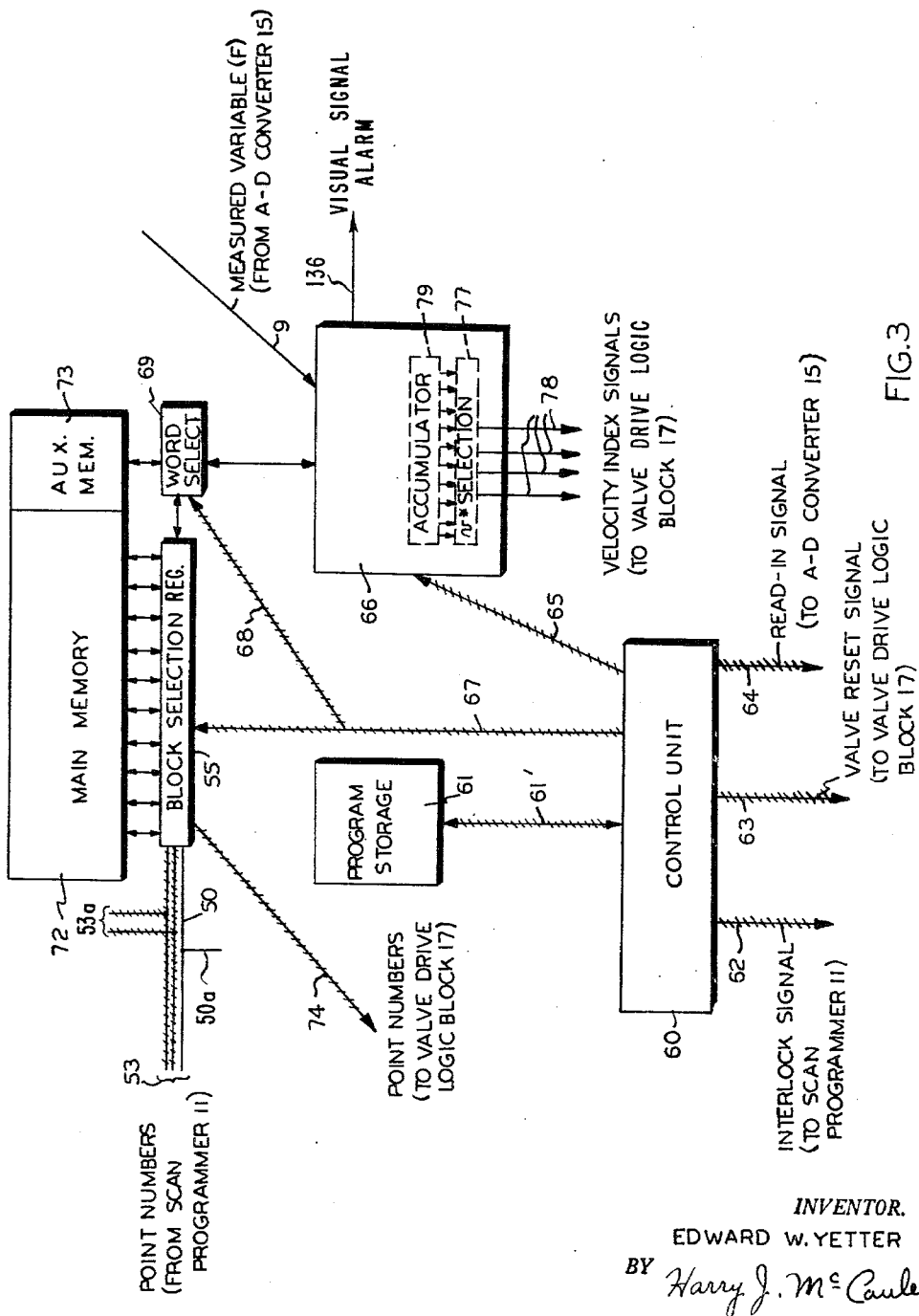
Figure 4:
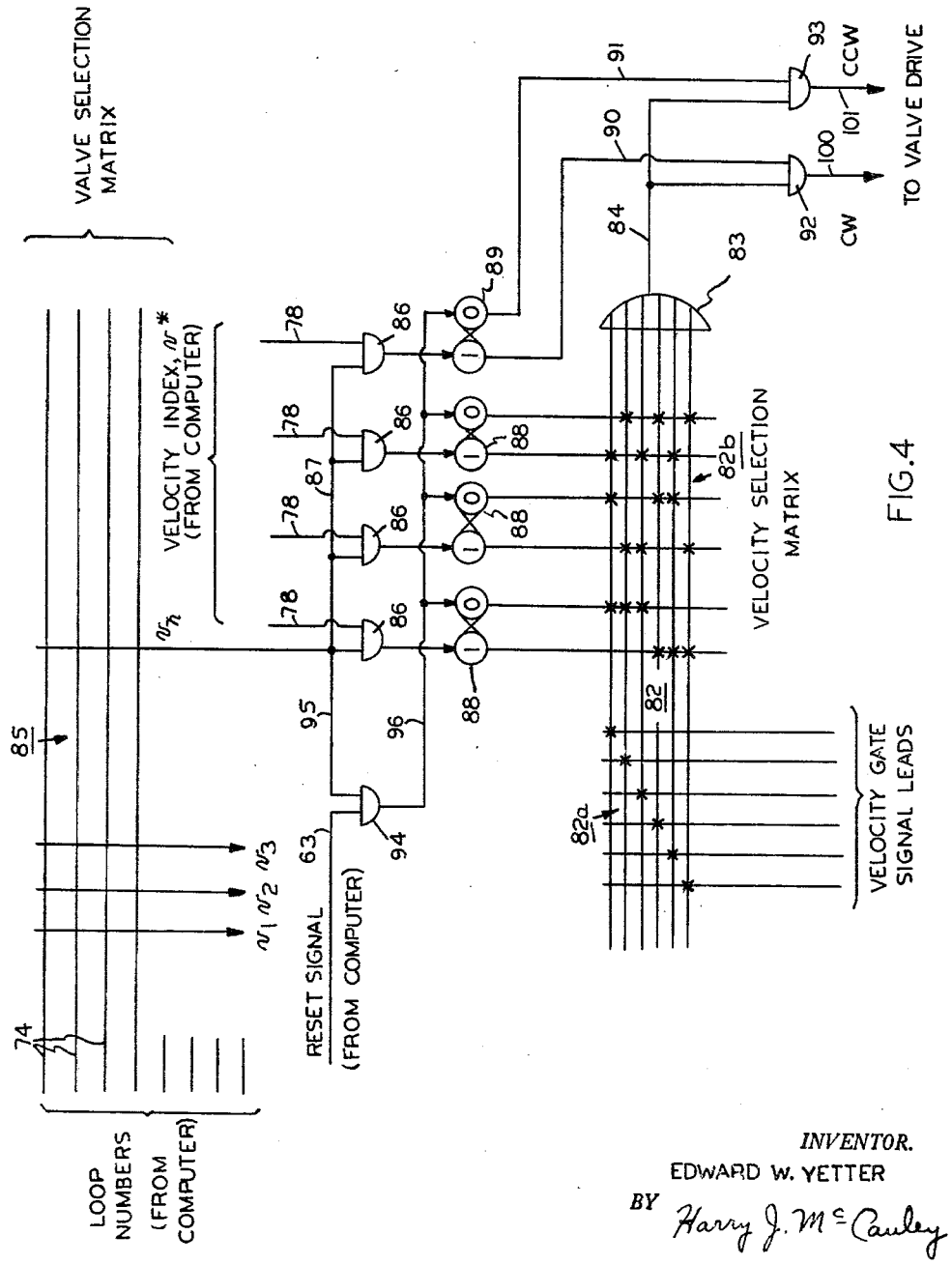
Figure 5:
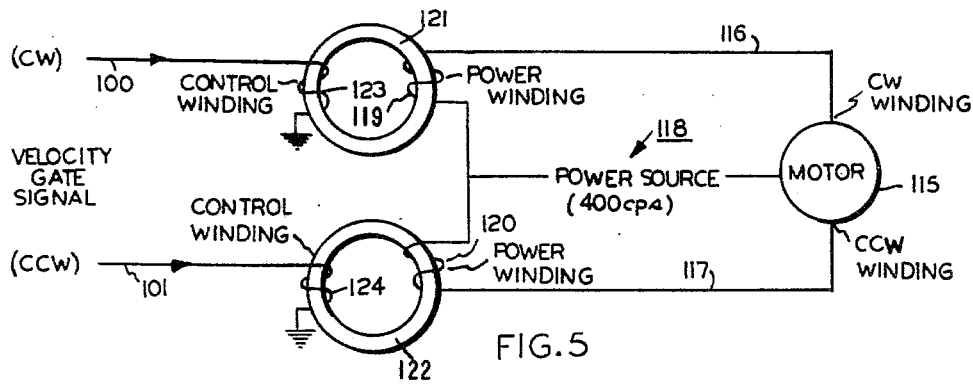
Figure 6:
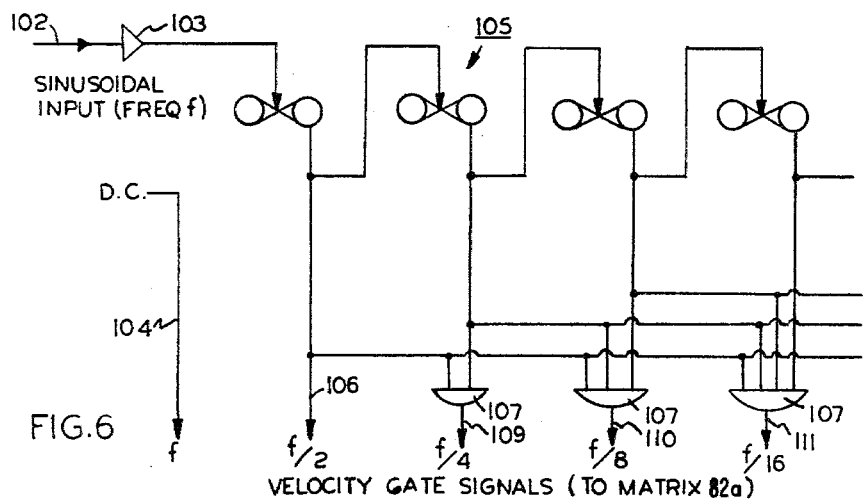
Figure 7:
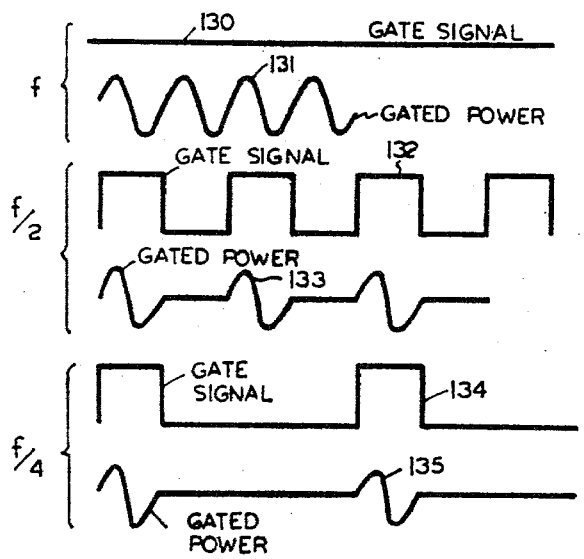

Another object of this invention is to provide a computer control method and apparatus adapted to service a large number of process points with an efficacy approaching continuous control. Still another object of this invention is to provide a computer control method and apparatus employing data sampling for each of a succession of process points in sequence followed by computation and effectuation of the particular corrective action required. Yet another object of this invention is to provide a control method and apparatus which operates by choice of one of a number of predetermined velocity pattern corrective actions adapted closest to obtain a desired control response within a preselected time interval. Other objects of this invention are to provide a control method and apparatus of improved simplicity in operation, economy in first cost and maintenance of equipment, and of high reliability. The manner in which these and other objects of this invention are attained will become clear from the detailed description and the drawings, in which:

FIG. 1 is a schematic representation of a preferred embodiment of complete apparatus according to this invention, wherein the controlled mechanisms are valves, with inter-relationships indicated by connecting lines, FIG. 2 is a schematic representation of the scan programmer section of the apparatus of FIG. 1, FIG. 3 is a schematic representation of the computer section of the apparatus of FIG. 1, FIG. 4 is a schematic representation of the valve drive logic section of the apparatus of FIG. 1, details beyond the valve selection matrix being limited to apparatus for only a single valve, FIG. 5 is a schematic representation of a magnetic amplifier switch for the condition control motor of the apparatus of FIG. 1, FIG. 6 is a schematic representation of the gating frequency generator for the apparatus of FIG. 1, and FIG. 7 is a diagrammatic representation of gating signal in relationship to gated power of the apparatus of FIG. 1.

Generally, this invention consists of a method of control of a condition comprising in sequence obtaining a signal upon which control is based, sampling repetitively the signal, computing a corrective action based on the signal adapted to alter the condition to a predetermined value, choosing one of a plurality of predetermined velocity pattern corrective actions responsive to the computation adapted closest to obtain the desired control response within the time interval existing between succesive sampling operations, and effecting alteration in the condition responsive to the chosen one of the plurality of predetermined velocity pattern corrective actions, together with apparatus for carrying out such method.

For purposes of detailed explanation, a typical chemical process valving control is hereinafter described wherein each of a multiplicity of control loops has its own valve, and control is effected by driving each valve in an opening or closing direction at a preselected one of a plurality of constant velocities, i.e., predetermined velocity patterns, to bring the controlled condition at each loop into the desired control response. A binary number system is employed as the code for information handling because of certain advantages hereinafter brought out.

FIGURE 1 shows schematically the general assembly of apparatus, wherein the flow of information is indicated by connecting lines provided with arrow heads in the direction of information transmission.

System timing is provided by a system clock 10, typically providing a constant time interval of 6.66±20% millisecs to the scan programmer 11, which effects the system identity co-ordination for each individual control loop in turn as indicated by the three information flow lines radiating therefrom.

Thus, scan programmer 11 indexes scan switch 12 to connect an individual one of the transducer D.-C. signal lines 14, each monitoring a single controlled variable, in circuit via line 8 through the conventional analog-digital converter 15, and thence through line 9 with computer 16. Simultaneously, scan programmer 11 connects computer 16 in circuit with the individual computation memory and associated facilities thereof reserved to the specific individual control loop being sampled, and also connects the specific valve positioning device 19 of valve 20 regulative of the condition upon which control is based in operative circuit through the valve drive logic block 17. Gate frequency generator 21 is the valve signal power source for the valve drive logic block 17. The legends adjacent the information flow lines from scan switch 12 to A–D converter 15, thence to computer 16 and finally to valve drive logic block 17 denote the nature of information supplied in sequence from left to right during the control of each point as hereinafter described in detail.

Control for all of the points in the embodiment of this invention described in detail is in accordance with the conventional two-function dynamic control equation, differentiated, however, to its velocity form.

The control equation is:

$$V = K(F_0 - F) + K/T \int_0^t (F_0 - F) dt$$

where:

$V$ = valve position,
$F$ = value of controlled variable,
$F_0$ = set point of controlled variable,
$K$ = proportional control constant, and
$T$ = reset control constant.

Taking the first derivative of this equation, the valve driving velocity $=v=dV/dt$ $$=K\frac{d}{dt}(F_0-F)+\frac{K}{T}(F_0-F)$$

A numerical form of this equation suited to computational operations is, then:

$$v=K_1[(F_0-F)_n-(F_0-F)_{n-1}]+K_2(F_0-F)_n$$

where:

$K_1=K/\Delta t$,
$K_2=K/T$,
$\Delta t$=Sample period, i.e., the time between two successive samples of the same point,
$n$ denotes present sample and $n-1$ the last previous sample.

Taking as an example a chemical process wherein two hundred points are to be controlled, five general types of transducers are typically necessary. On analysis, an accommodation of individual points to the total involved indicates that a binary geometric progression can be conveniently utilized to segregate the points in terms of Time Units/Sample into six separate "Sampling Zones" on the basis of the rate of control response which can be expected for the loop characteristics involved. It is convenient to choose as the Time Unit the elapsed time, i.e., sampling period, between successive samplings of the same point in the group having the highest sampling frequency, which, in this instance, is zone A, and this has been hereinafter done in the description. A tabulation of zone sampling times on this basis is as follows:

Table 1

| Sampling Zone | Time Units (of typically 1.25 sec. duration) per Sample | No. of Points | Typical Type Transducer |
| --- | --- | --- | --- |
| A | 1 | 80 | Flow measuring. |
| B | 2 | 40 | Pressure, or some level measuring. |
| C | 4 | 30 | Level, or some temperature measuring. |
| D | 16 | 20 | Temperature measuring. |
| E | 64 | 20 | Temperature, or some composition measuring. |
| F | 256 | 10 | Composition measuring. |

Moreover, comparative performance tests indicate that a minimum of about eight samplings per loop time constant are necessary in order to achieve the same standard of control performance with sequential sampling as with continuous control by use of a conventional proportional plus reset analog controller. In fact, at the eight samplings/loop time constant rate, the quality of control obtained according to this invention is, for practical purposes, indistinguishable from that of conventional continuous control. A switching rate of 150 points/sec. was adequate for the purposes and, with the data hereinbefore resolved, the computational terms can be settled upon.

A typical range of numerical values for the computational terms for the system of 200 points selected as example is as follows:

$F_0=0$ to 1023 (normalized full-scale range of set point adjustment),
$F=0$ to 1023 (normalized full-scale range of measured variable),
$K=0.2$ to 200,
$\Delta t=1.25; 2.5; 5.0; 20.0; 80.0; 320$ seconds, and
$T=0.6$ to 3000 seconds.

The ranges of constants $K_1$ and $K_2$ are preselected to be the maximum values which obtain for the widest of the case combinations which can be anticipated from the parameters detailed. The tolerance of setting the constants $K_1$ and $K_2$ is, typically, $\pm 5\%$ of nominal, so that they may be expressed as 5 significant bits times the appropriate power of 2 with adequate resolution.

The computation time of computer 16 is determinative of the feasible operating time rate for the system, and a practical period for system clock 10 was chosen on this basis to be 6.66 millisecs. Accordingly, a Minor Scan Cycle (hereinafter abbreviated as "MSC") is 2 x clock period. A zone A point is measured sequentially during a given phase of every MSC, whereas points of all other zones are interspersed in systematic relationship and measured sequentially during the remaining phase of the MSC. Accordingly, from start-up at time zero, the schedule of point measurement for each of the six zones is as follows:

Table 2

A zone A point is measured every 1 MSC.
A zone B point is measured every 2 MSC starting on MSC No. 1.
A zone C point is measured every 4 MSC starting on MSC No. 0.
A zone D point is measured every 16 MSC starting on MSC No. 2.
A zone E point is measured every 64 MSC starting on MSC No. 6.
A zone F point is measured every 256 MSC starting on MSC No. 10.

For ease of visualization, this can be reduced to a table wherein the MSC is identified both by decimal and binary designations for each phase of the specific clock period and the individual scanned points are identified by their zone letters with a numerical subscript for each specific one of the 200 controlled points, up to the capacity of the table set forth.

Table 3

| Clock Period No. | MSC No. (dec.) | MSC No. (binary) | MSC Phase | Scanned Point |
| --- | --- | --- | --- | --- |
| 0 | 0 | 00000000 | a | $A_1$ |
| 1 | 0 | | b | $C_1$ |
| 2 | 1 | 00000001 | a | $A_2$ |
| 3 | 1 | | b | $B_1$ |
| 4 | 2 | 00000010 | a | $A_3$ |
| 5 | 2 | | b | $D_1$ |
| 6 | 3 | 00000011 | a | $A_4$ |
| 7 | 3 | | b | $B_2$ |
| 8 | 4 | 00000100 | a | $A_5$ |
| 9 | 4 | | b | $C_2$ |
| 10 | 5 | 00000101 | a | $A_6$ |
| 11 | 5 | | b | $B_3$ |
| 12 | 6 | 00000110 | a | $A_7$ |
| 13 | 6 | | b | $E_1$ |
| 14 | 7 | 00000111 | a | $A_8$ |
| 15 | 7 | | b | $B_4$ |
| 16 | 8 | 00001000 | a | $A_9$ |
| 17 | 8 | | b | $C_3$ |
| 18 | 9 | 00001001 | a | $A_{10}$ |
| 19 | 9 | | b | $B_5$ |
| 20 | 10 | 00001010 | a | $A_{11}$ |
| 21 | 10 | | b | $F_1$ |
| * | * | * | * | * |
| 36 | 18 | 00010010 | a | $A_{19}$ |
| 37 | 18 | | b | $D_2$ |

Resorting to a binary number system as the code for information handling, the identification of points for the effectuation of proper sequencing requires as essential basis only the underscored portion of the binary MSC No. equivalent.

Referring to FIG. 2, the scan programmer comprises an 8-bit binary master counter 25 which has a capacity of $2^8$, i.e., 256, equal to the ratio of the maximum Time Units/sample case, i.e., zone F, to the minimum Time Units/sample case, i.e., zone A, and a point-binary counter for each zones, e.g., 26 for zones A, 27 for zone B, and so forth (the others being omitted from the showing) which are each adapted to reset at a number equal to the number of points included in the particular zone involved. System clock 10 trips a scale-of-two counter 28 by connection through line 29, and counter 28 steps either zone A counter 26 or master counter 25 in alternation, phase $a$ of counter 28 being devoted to the scanning of A zone points whereas phase $b$ is devoted to the scanning of the points of all of the remaining zones in accordance with the schedule hereinbefore set forth. Moreover, the circuit arrangement is such that read-out of zone A point numbers occurs in phase $a$, whereas zone A counter (i.e., counter 26) advance occurs in phase $b$. Read-out of all other zone point numbers occurs in phase $b$, this being achieved through conductor 30 running to zone A counter 26, and common conductor 30$c$ branched from 30 to the gates 40, hereinafter described, of the remaining zone counters in parallel.

Master counter 25 comprises a multiplicity of bistable switching devices 33, 33$a$, etc., in this case cascaded binary counters (not detailed as to circuitry in the drawings) which are effectively $2^0$, $2^1$, etc., respectively. A multiplicity of zone selection gates 34, only one of which is detailed, are provided, so that connection is sequentially made with all of the zone counters after zone A in accordance with the binary code drawn in adjacent the lines 35–39, inclusive [applicable to conditions immediately following start-up, as set out in Table 3] running to the individual zones denoted. These lines each run to another AND gate, e.g., 40 (zone B) for each zone to which 30$c$ also runs, thereby establishing the identity of each specific zone as switching proceeds. The output of each gate 40 is then led through a line 41 to a point selection gate block, which, in the case of zone B, is denoted schematically at 42. All of these blocks are similar in construction, in that they vary only in the number of individual AND gates in each, two of the latter being required per bit. These point selection AND gates 44 are detailed in part only for the zone A block 43. A common input to all of gates 44 is the combined zone and phase identification signal introduced via line 45, corresponding to line 41, or the equivalent, for all of the succeeding zones, while the other input is from the individual binary counters, each combination of which is reserved uniquely to a given control loop within the zone via lines 46, 46′, 46″, etc. The point select counters are each provided with reset connections, e.g., 47 for counter 26 and 48 for counter 27, which restore them to their initial states after stepping has proceeded through the full repertory of points for each specific zone. Finally, there is provided a zone selection connection, such as 50 for zone A and 51 for zone B, which connect directly to the block address selection register 55 of the computer (refer FIG. 3).

All point number outputs are consolidated by transmission through an assemblage of OR gates 52, each of which has as inputs the corresponding counter position points $2^0$ to $2^6$, respectively, for each of the six zones A–F, inclusive (detailed only for the $2^6$ position of zone A, FIG. 2). The outputs of paired OR gates corresponding to each bit are taken off through two-conductor lines denoted at 53, also connecting directly with block address selection register 55 (FIG. 3). Since the same point identification information is required for actuation of conventional design scan switch 12, this is conveniently supplied via branch lines 50$a$ and 53$a$ connecting (not detailed) with the scan switch.

The computation required according to this invention can be accomplished by a variety of commercially available computers; however, the computer detailed schematically in FIG. 3 is especially preferred. Control connection lines are indicated by cross hatching, whereas channels utilized for information transmission solely are indicated by smooth lines.

This computer is controlled via line 61′ through a control unit 60 in accordance with a wired program storage 61, which control unit is provided with five control output lines, of which 62 is an interlock signal line connecting with scan programmer 11, 63 is a valve reset signal line running to valve drive logic block 17, 64 is a read-in signal line connecting with A–D converter 15, and 65 is a computation directing line running to the computer arithmetic unit, denoted at 66. Finally, there is control line 67 connecting with block address selection register 55 and, by branch control line 68 therefrom, with word select unit 69.

The main memory 72 of the computer receiving the information from block address selection register 55 is preferably provided with an auxiliary working memory 73 co-operating with word select unit 69. Such a design insures a minimum-access-time source for the constants employed in the computation, as well as a temporary storage with minimum-access-time for intermediate computation operations. Conveniently, the point number supply data from scan programmer 11 is routed via block address selection register 55 to control line 74 running to valve drive logic block 17.

The function of computer 16 is to perform a computation for each control loop in turn which, sequentially, consists of the following general steps:

(a) Receiving a binary number corresponding to the numerical value of the measured variable, (b) Receiving a binary number identifying the control loop to be computed.

(c) Solving the dynamic control equation, using the measured variable from step $a$ and the appropriate stored constants corresponding to the loop identified in step $b$.

(d) Selecting the appropriate valve velocity corresponding to the equation solution of step $c$, and (e) Furnishing an operating signal to the control valve corresponding to the loop under surveillance.

Control of the system of the detailed example was found to be practicable by the computer selection of one of seven predetermined velocity pattern corrective actions for any given one of zones A–F. However, in the interests of simplicity of information handling, the identification of the computer choice is preferably effected in accordance with a velocity index, $v^*$, where $v^*=f(v)$, and $v=$the computed valve velocity. The relationship of the quantities involved is tabulated as follows, with $v$ reported in both decimal and binary notations, together with the number of initial zeroes occurring for each binary $v$ category:

*Table 4*

| $v$ (Decimal) | $v$ (Binary) | | No. of initial zeroes | $v^*$ | Control valve velocity (incremental steps/sample period) |
|---|---|---|---|---|---|
| 0–1 | 0000000000 | 0000000001 | 9–10 | 0 | 0 |
| 2–3 | 0000000010 | 0000000011 | 8 | 1 | 1 |
| 4–7 | 0000000100 | 0000000111 | 7 | 2 | 2 |
| 8–31 | 0000001000 | 0000011111 | 5–6 | 3 | 8 |
| 32–127 | 0000100000 | 0001111111 | 3–4 | 4 | 32 |
| 128–511 | 0010000000 | 0111111111 | 1–2 | 5 | 128 |
| 512–1023 | 1000000000 | 1111111111 | 0 | 6 | 512 |

From the foregoing, it is seen that, while calculation of $v$ requires 10 bits of information, $v^*$ can be uniquely related to the number of initial zeroes of each entry of the table. This number can be designated by the use of only 3 bits of information, to which, however, a designation of sign must be added. The internal section of the arithmetic unit 66 reserved for $v^*$ selection is indicated at 77, from which run the four velocity index advice lines 78 connecting with valve drive logic block 17. Immediately ahead of $v^*$ selector 77 in the calculation sequence is the accumulator, indicated schematically at 79. It is preferred to determine the velocity index by static gating of the flip-flop circuits of accumulator 79, because time savings are thereby achieved, but direct counting can be used if desired.

It is convenient to utilize a 10-bit binary computer; however, this is difficult to achieve by conventional data handling techniques due to the required range of the constants $K_1$ and $K_2$. One way of overcoming this difficulty is to store $K_1$ and $K_2$ as 10-bit words consisting, however, of 5 significant bits plus a 4-bit exponent. It happens that $K_1$ and $K_2$ are always positive and can be handled in reliance on this fact; however, other constants, such as the $K_3$ hereinafter described, can be either positive or negative, so that a tenth bit should, as a general matter, be reserved for sign designation. The substitute routine of computation then involves multiplying the word in accumulator 79 (10 bits) by the 5 significant bits in the multiplier in conventional manner, then shifting the contents of the accumulator by the number of places defined by the stored exponent in the direction defined by the exponent sign. This is advantageous because it permits storage of the entire range of constants to adequate precision in a 10-bit word, minimizes multiplication time, and permits the use of a 15-bit accumulator. In order to further maximize computer speed, it is preferred that the shift operation be performed by a shift-register type operation in accumulator 79, employing flip-flops instead of a recirculating type register.

For the typical system described, a capacity in memory 72 equal to 800 words for constant and previous result storage proved entirely adequate; however, it will be understood that added memory capacity is required for any additional optional computation as hereinafter described.

Turning now to the valve velocity drive pattern for the specific system detailed, it was determined from process requirements that the following seventeen actual (average), as distinguished from normalized, valve velocities were adequate, these velocities being reported in terms of incremental steps/Time Unit, where an incremental step=0.1% full valve travel±20%, and the Time Unit is as hereinbefore defined.

*Table 5*

| Sampling zone | A | B | C | D | E | F |
|---|---|---|---|---|---|---|
| Velocity Index v*: | | | | | | |
| 0 | 0 | 0 | 0 | 0 | 0 | 0 |
| 1 | 1 | 1/2 | 1/4 | 1/16 | 1/64 | 1/256 |
| 2 | 2 | 1 | 1/2 | 1/8 | 1/32 | 1/128 |
| 3 | 8 | 4 | 2 | 1/2 | 1/8 | 1/32 |
| 4 | 32 | 16 | 8 | 2 | 1/2 | 1/8 |
| 5 | 128 | 64 | 32 | 8 | 2 | 1/2 |
| 6 | 512 | 256 | 128 | 32 | 8 | 2 |

The valve drive logic apparatus denoted generally at 17, FIG. 1, is detailed in FIGS. 4 and 6, the complete circuitry for only a single valve being shown. This effectuates the selection of the appropriate valve driving velocity and utilizes a velocity selection powered circuit, e.g., the diode matrix indicated generally at 82. A section 82a of the matrix is wired for specificity of the individual speeds for each of the given Zone A–F, whereas the other section, 82b, is wired for specificity of computed velocity index for each control loop designated in advance by decoding matrix 85 hereinafter described, so that the output from OR gate 83 transmitted through line 84 is a unique valve drive velocity signal for a given valve 20, FIG. 1. These valves can, of course, vary widely in design, depending upon process requirements, but a typical construction is explosion proof (together with all auxiliaries), 500 lb. thrust, 1″ stroke, 2 sec. full stroke time (maximum) and having a resolution 0.1% full stroke.

The signals for valve selection need be supplied only at gating (i.e., signal) power level, reserving motive power levels to the valve drive motors. The velocity drive pattern hereinbefore set forth (Table 5) is in conformity with the binary geometrical progression, consistent with the sampling rates (Tables 1–3) and velocity indices (Table 4) previously described, and a permissible variation within ±10% from exact values can be tolerated.

In the interests of economy and control precision, it is preferred to use identical pulse motors for valve driving, as hereinafter described, under which circumstances a total of seventeen distinct pulse frequencies (corresponding to the seventeen distinct valve velocities tabulated) are required to be delivered selectively to the velocity selection matrices 82, it being understood, however, that a total of only six pulse frequencies need be supplied to any single matrix. This is readily achieved by a frequency dividing technique. Thus, the maximum valve drive velocity of Table 5 is 512 and, for the basic system Time Unit of 1.25 seconds detailed, there is calculated a maximum frequency of 512/1.25, or 410 c.p.s. In practice, a standard frequency of 400 c.p.s. is entirely adequate from the standpoint of precision.

Valve selection power is generated from a central apparatus detailed in FIG. 6. The basic 400 c.p.s. frequency is supplied as a sinusoidal input from a conventional source through line 102 and squared or sharpened, if necessary, by amplifier 103.

Since a 400 c.p.s. motor power drive is employed as hereinafter described, the gating required from matrix 82 must be continuously "on" for the 512 maximum speed valve drive, and this is supplied by a direct current signal through line 104, the obtained frequency being indicated by the legend $f$. The other frequencies are obtained by routing the basic frequency through a sixteen-bit binary counter indicated in part by the general reference numeral 105. The output delivered from the first binary counter stage of 105 is that supplied through line 106 and is a gate signal insuring a valve driving velocity of precisely 256 steps/Time Unit, i.e., $f/2$. Each stage after the first is provided with an AND gate 107 with inputs common to all preceding gates 107, providing a constant "on" time at a frequency successively halved in each successive stage of counter 105 in order from left to right. Consequently, line 109 delivers a gating signal of $f/4$ (or 128 steps/Time Unit), line 110 a signal of $f/8$, line 111 a signal of $f/16$, etc., through to the smallest velocity value of 1/256, corresponding to $f/131,072$. As hereinbefore mentioned, only six of the total of seventeen gating velocities available are required for any given one of the six zones A–F, and this selection is effected by suitably wiring in the lines 106, and 109, 110, 111, etc., designated collectively as velocity gate signal leads in FIG. 4, connecting into matrix section 82a for each specific one of the six zones. Zero valve gating velocity is provided by wiring matrix section 82b so that no output is delivered through OR gate 83 and line 84 when bistable switching devices 88 collectively stand in their 0-0-0 state, corresponding to a zero magnitude velocity index signal input.

Loop identifcation is achieved by use of a valve selection network, such as the decoding matrix indicated schematically at 85, the input to which are unique loop numbers (8 bits of information) supplied through lines 74 running from block address selection register 55 (FIG. 3) as hereinbefore described. Output lines for individual control valves such as $v_1$, $v_2$, $v_3$, etc., are shown; however, the circuit for only a single one, $v_n$, is detailed in FIG. 4 as regards gating. This gating is accomplished by the use of four AND gates 86, to individual ones of which are connected the four velocity index output lines 78. The output $v_n$ line connects to one side of all of the gates 86 via line 87, and the outputs of the three gates reserved to numerical designation of $v^*$ go to individual bistable switching devices 88 which complete the conection to matrix section 82b.

The output of the velocity index sign designation gate 66 goes to bistable switching device 89, individual output phases of which connect through lines 90 and 91 to single sides of individual AND gates 92 and 93, respectively. The remaining connections to these gates are from OR gate 83 through line 84. Thus, the outputs of gates 92 and 93, delivered via lines 100 and 101, respectively, are gating, directionally distinctive, motor drive signals which are, typically, clockwise (CW) for 92 and counter-clockwise (CCW) for 93. Valve reset is accomplished by providing AND gate 94, one input line 95 of which is connected to the outputs $v_1, v_2, v_3 \ldots v_n$ individually, and the other input of which is control line 63 from the computer (FIG. 3). The output of gate 94 is passed via line 96 to the "zero" inputs of all the switching devices 88 and 89.

A preferred valve drive mechanism (corresponding to 19, FIG. 1) is detailed in FIG. 5, this comprising a reversible pulse type synchronous motor 115 for each valved point, which has a clockwise rotation winding lead 116 and a counter-clockwise rotation winding lead 117. These each complete circuits to the 400 c.p.s. motor power source 118 through magnetic amplifier windings 119 and 120, respectively. The magnetic amplifiers are each provided with a square hysteresis loop core 121 and 122, and with grounded D.-C. bias windings 123 and 124, the design being such that, without a D.-C. bias, the applied power frequency just traverses the hysteresis loop of the cores, so that the cores present a high motor power circuit impedance which is essentially an open circuit. On the other hand, when a unidirectional gating signal is transmitted through either one of the leads 100 or 101, the corresponding core is biased beyond saturation for the duration of the gate period. In this condition the core presents a very low saturated impedance to power source 118, and motor 115 is driven a finite number of steps corresponding exactly to the frequency of the gating signal applied.

Thus, referring to FIG. 7, at the maximum motor drive speed of 512 steps/Time Unit, corresponding to frequency $f$ of FIG. 6, a D.-C. biasing signal 130 applies full 400 c.p.s. frequency 131 driving power to drive motor 115. The gate signal 132 from the first stage of counter 105, supplied through line 106, permits motor drive to occur only during alternate cycles of power source 118, or at a frequency $f/2$, corresponding to 133. Similarly, a gate signal 134 of frequently $f/4$, such as supplied via line 109, constrains motor drive to only every fourth cycle of power source 118, corresponding to 135. It will be understood that, while the sampling of any individual point is of a duration of only about 6.66 millisecs, or less, velocity selection matrix 82 remains set, responsive to the last determined value of velocity index, $v^*$, supplied it, until just before the next-following sampling occurs, when it is reset to zero as hereinafter described immediately preparatory to adjustment to a new control setting. Thus, the motor 115 is driven at a constant stepping rate (i.e., constant average velocity) in the interim between successive samplings.

Certain conventional auxiliary equipment is desirable in a control apparatus such as that hereinbefore described, and this can be readily combined with the system. One of the auxiliaries is a visual alarm, which can operate directly from the arithmetic unit 66 (FIG. 3) of computer 16 (FIG. 1) via line 136. A desirable indication is whether a measured variable is outside of preset tolerance limits, together with identification of the specific variable. Typically, such an alarm signals if the absolute value of the equation term $(F_o-F)$ exceeds the preselected low or high tolerance limits for the conditions where $(F_o-F)$ is, respectively, greater than or less than zero, information which is supplied by the computer. There is required computer storage of two or more words in the memory, i.e., $L_m$, the low tolerance limit, and $L_h$, the high tolerance limit, and also the addition of a comparison operation, all of which is effected conventionally. The alarm can be used to actuate an annunciator board, or similar device, to provide a visual signal of abnormal operation.

It is preferred that there be provision for over-riding manual operation of all valves, as indicated generally by arrow 137, FIG. 1, to facilitate start-up, enable full manual operation in an emergency and for limited manual operation as an aid to maintenance. Desirably, manual over-ride equipment should include a single master transfer switch which removes computer control from all valves, while retaining every valve at its last control position subject to manual operation. Manual control can additionally be extended to sub-groups of valves, such as individual ones of 4 groups of 50 valves each in the example detailed. These sub-groups can have individual manual-automatic control stations enabling disconnection of any one or all of the 50 valves from computer control as hereinbefore described for the master transfer switch, and manual operation of any valve by push button at maximum velocity in either direction, via circuitry independent of all normally used power switching devices, gating circuits and all other equipment exclusive of the primary power source. Additionally, provision for manual operation at an inching velocity equal to, e.g., 1/256 of maximum velocity, using a minimum of the regular switching devices, gating and other circuit facilities is advantageous.

It is moreover desirable to provide valve position indicators, such as individual linear differential transformers or variable resistors on each valve connected to a centrally-located measuring circuit, adapted to indicate visually the position in terms of percent full travel of a given valve to a precision of about ±5%. This latter indication can be beneficially combined with simultaneous indication of mode of operation, i.e., whether fully automatic, full manual, or partial automatic, with concomitant signalling of which block or individual valve is currently under manual operation.

Finally, it is usually desirable, for maintenance and checking convenience, to provide manual means for single-point stepping of scan programmer 11, selection of any one point and initiating a single loop computation. Similar features include facilities for parity-bit checking in computer 16 and an automatic, or manually initiated, marginal test procedure for preventive maintenance.

The operation of individual apparatus components has been largely described in conjunction with the apparatus description, so that the following explanation of operation is directed to the system as a whole.

The system timing is provided by system clock 10, which actuates scan programmer 11 as hereinbefore described to cause scan switch 12 to step through the full repertory of control loops in sequence and thus connect each transducer line 14 in individual electrical circuit via line 8 with A–D converter 15, and thence via line 9 with computer 16.

Scan programmer 11 provides individual point identification and time allocation simultaneously for the entire apparatus by information inputs to scan switch 12, computer 16, and valve drive logic block 17. The Minor Scan Cycle (MSC) hereinbefore defined is a complete cyclic operation of scale-of-two counter 28 and, from reference to FIG. 2, it is seen that the $a$ phase output drives 8-bit (256) master counter 25 so that gates 34 on the output sides of the counter flip-flops set up the individual Zone Selection codes corresponding to the several zones B through F denoted. The coded zone selection outputs through lines 35–39, inclusive, each drive an individual Point Select Counter, e.g., counter 27 for zone B, and also furnish a continuous gating signal for the duration of the MSC. This gating signal is ANDed with a similar signal from the $b$ phase of counter 28 in gates such as 40, and the result is ANDed with the output of the gates 44 (detailed for zone A only) associated with the Point Select Counters, such as 27. This furnishes a coded point number of the proper zone at the proper time made available at OR gates 52.

The operation with respect to zone A is in all respects similar to that of zones B–F, except that the Point Select Counter 26 is driven from the $b$ phase output of counter 28 and the gating signal is furnished from the $a$ phase.

The selected coded point numbers from each zone are consolidated at OR gates 52, thereby furnishing a coded selected point number which is made available at lines 53. In addition, the signal transmitted through line 45, and line 41 and equivalent lines for succeeding zones, denotes (via lines 50, 51 and equivalents) the specific zone to which a point number applies. Accordingly, the complete identification of a control loop consists of a zone identification, i.e., one of six lines and a coded point within the zone.

Transmission of the measured variable F of the control equation is, in analog form, through line 8 to conventional A–D converter 15, and, thereafter, in digital form through line 9 to computer 16.

Operation of computer 16 can be accomplished in a manner enhancing overall system speed by overlapping the computer function to a high degree with the measuring function. At the outset of the computation cycle, the loop identification number is available from scan programmer 11, as is also the digitized measured variable, from A–D converter 15. A preferred general sequence of computation utilizing the apparatus of FIG. 3 then consists of the following, it being understood that practical simultaneity is obtained for some of the several steps:

(1) reading the measured variable (F) through line 9 into accumulator 79 of arithmetic unit 66, (2) reading the loop number identification via lines 50 and 53 into computer block address selection register 55, (3) generating the interlock signal transmitted through line 62 to scan programmer 11, allowing selection of the next loop for digitizing, (4) reading the necessary constants and the result of the previous computation, i.e., $F_0$, $K_1$, $K_2$, $(F_0-F)_{n-1}$, out of main memory 72 into auxiliary memory 73, (5) performing the necessary computations for $v$, within arithmetic unit 66, (6) determining the velocity index $v^*$, (7) reading $v^*$ via lines 78 to the valve actuation subsystem of FIGS. 4, 6 and 7, (8) reading a new value of $(F_0-F)_{n-1}$ into main memory 72, and (9) resetting the entire computer apparatus to its original state preparatory to repetition of the computation cycle.

Immediately after step 3 of the computer operation, scan switch 12 is caused to index to the next scheduled point by signal transmitted via control lines 50a and 53a. Thus, there is a reading and storage of inputs early in the cycle, which makes available a greater share of cycle time for the reading and digitizing of the next-following variable.

The operation of the several valves as a result of the computation described has been hereinbefore detailed as part of the apparatus description.

In summary, the operation of this invention consists sequentially of (1) a discrete sampling of measured process data, (2) multiplexed computation of dynamic control functions and (3) discrete velocity adjustment of final control. The selection of one of the multiplicity of available predetermined velocity pattern corrective actions is, as will be evident from inspection of Tables 4 and 5, predicated on obtaining a high resolution when the variable under control is in the region near the control point, and rapid corrective action when it is some distance from the control point.

The specific system hereinbefore described in detail as one embodiment of this invention is one adequately controlled by a 2-function computation; however, the invention is not so limited. Thus, it is sometimes desirable to include additional functions for some or all of the loops, and the following are typical of controls of an increased complexity.

The first is one utilizing a cascade control function for the control of a loop which is actually a combination of two individual loops, wherein the set point of the secondary loop is adjusted in accordance with the computed output of the master loop. The overall computation necessary in this instance can be expressed as:

$$F_{0(s+1)} = F_{0s} + v_m$$

where:

$F_0$ = set point of secondary loop,
$s$ = present value,
$s+1$ = next value, and
$v_m$ = computed velocity of master loop.

For cascade control, one additional word of storage is required, namely, the address of $F_{0s}$, an additional add operation, i.e., $(F_{0s}+v)$, is necessary, and there must be an additional memory write operation, $F_{0s+1}$. The additional operations can be achieved as follows in conjunction with the operation hereinbefore described:

(1) compute in the normal fashion and retain the results in accumulator 79, (2) store the address of the block containing $F_{0s}$ in a reserved portion of auxiliary memory 73, (3) read the remaining contents (i.e., exclusive of data of step (2) of auxiliary memory 73 back to main memory 72, (4) read the new block address to block address selection register 55, (5) read the new block containing $F_{0s}$ to auxiliary memory 73, (6) perform the computation and retain the results in accumulator 79, (7) read $F_{0s+1}$ into auxiliary memory 73, and (8) read the entire block from auxiliary memory 73 back into main memory 72.

Another mode of control involves inclusion of a rate function which introduces a factor of proportionality to the rate of change of the measured variable, whereupon the basic control function becomes:

$$V = K(F_0-F) + \frac{K}{T}\int_0^t (F_0-F)dt + KT_D\frac{d}{dt}(F_0-F)$$

where $T_D$ = the rate constant, and all other terms are as hereinbefore defined. Then, on differentiation, $$v = K\frac{d}{dt}(F_0-F) + \frac{K}{T}(F_0-F) + KT_D\frac{d}{dt}\left\{\frac{d}{dt}(F_0-F)\right\}$$

A suitable numerical form of this equation for control effectuation is:

$$v = \frac{K}{\Delta t}\left\{(F_0-F)_n - (F_0-F)_{n-1}\right\} + \frac{K}{T}(F_0-F)_n +$$
$$\frac{KT_D}{\Delta t^2}[\{(F_0-F)_n - (F_0-F)_{n-1}\} - \{(F_0-F)_{n-1} - (F_0-F)_{n-2}\}]$$

or $$v = K_1(\tau n) + K_2(F_0-F)_n + K_3(\tau_n - \tau_{n-1})$$

where $$\tau n = \{(F_0-F)_n - (F_0-F)_{n-1}\}$$

and $$K_3 = \frac{KT_D}{\Delta t^2}$$

$n$ denotes present value and $n-1$ denotes the last previous value. In the foregoing, $T_D$ typically varies from about 0 to about 1200 sec., the ranges of the other variables being as hereinbefore set forth.

Effectuation of rate control necessitates the addition of two more memory words, namely, $K_3$ and $\tau_{n-1}$, and provision for an additional add and multiply operation. All operations are performed as hereinbefore described, except that, because of the range requirements of $K_3$, it is necessary to include both positive and negative exponents.

The embodiment of apparatus described as the detailed example makes use of D.-C. transducer signals; however, A.-C. transducers can, of course, be employed with conventional A.-C. to D.-C. converters or, in fact, by the utilization of a complete A.-C. digitizing system. Also, it is practicable to utilize analog computation instead of digital computation for effectuation of the computation of this invention, although this is usually less preferred, especially where a great number of control loops of widely different time constants are involved. Moreover, while the example apparatus utilizes a single common control equation applicable to all loops, it is entirely practicable to program the computer to process different equations for different loops. In addition, while the predetermined velocity pattern corrective actions are constant velocities in the case of the example, obviously, patterns incorporating continuously varying velocities, or velocities constant and varying in staged timing, are equally feasible. Finally, while valves have been described in the example as the direct control effecutation means, these can be linear or non-linear resistors, variable transformers, or a great variety of equivalent control agencies.

This invention is advantageous from the standpoint of reduced capital investment in effecting process control and, additionally, utilizes a system which is compatible with future extended use of digital computer supervisory or multi-variable control, while being flexible enough to permit substitution of new dynamic control functions for those in current use as such new functions demonstrate their superiority.

From the foregoing it will be apparent that this invention can be modified in numerous respects within the skill of the art without departure from its essential spirit, and it is therefore intended to be limited only within the scope of the following claims.

What is claimed is:

1. A control apparatus comprising, in combination, a transducer generating a signal which is a function of a condition upon which control is to be based, means sampling repetitively said signal, computer means receiving as an input said signal generated by said transducer adapted to compute a corrective action based on said signal, means providing a plurality of predetermined velocity pattern corrective actions proportioned to cause said condition to approach a predetermined value within the entire range of variation for said condition during the time interval existing between successive sampling operations, means choosing one of said plurality of predetermined velocity pattern corrective actions matching the value of said corrective action determined by said computer, and means effecting a direct alteration in said condition responsive to the chosen one of said plurality of predetermined velocity pattern corrective actions.

2. An electrical control apparatus comprising, in combination, a transducer generating a signal which is a function of a condition upon which control is to be based, a scan switch sampling repetitively said signal, a computer receiving as an input said signal generated by said transducer adapted to compute a corrective action based on said signal, a powered circuit providing a plurality of predetermined velocity pattern corrective actions proportioned to cause said condition to approach a predetermined value within the entire range of variation for said condition during the time interval existing between successive sampling operations, means including a decoding network and a gating system responsive to said decoding network for choosing one of said plurality of predetermined velocity pattern corrective actions matching the value of said corrective action determined by said computer, and powered means effecting direct alteration in said condition responsive to the chosen one of said plurality of predetermined velocity pattern corrective actions.

3. An electrical control apparatus according to claim 2 wherein said plurality of predetermined velocity pattern corrective actions consist of patterns which have substantially constant average velocities.

4. An electrical control apparatus comprising, in combination, a transducer generating a signal which is a function of a condition upon which control is to be based, a scan switch sampling repetitively said signal, a computer receiving as input said signal generated by said transducer adapted to compute a corrective action based on said signal, a powered circuit providing a plurality of predetermined substantially constant average velocity pattern corrective actions proportioned to cause said condition to approach a predetermined value within the entire range of variation for said condition during the time interval existing between successive sampling operations, means including a decoding network and a gating system responsive to said decoding network for choosing one of said plurality of predetermined substantially constant average velocity pattern corrective actions matching the value of said corrective action determined by said computer, and means comprising an electric pulse motor for effecting direct alternation in said condition responsive to the chosen one of said plurality of predetermined substantially constant average velocity pattern corrective actions.

5. An electrical control apparatus according to claim 4 wherein frequency dividing means are employed to energize said powered circuit and thereby provide said plurality of substantially constant average velocity pattern corrective actions.

6. An electrical control apparatus according to claim 4 wherein said powered circuit is energized at signal power level and said electric pulse motor is energized at motive power level.

References Cited by the Examiner

UNITED STATES PATENTS 2,932,471  4/60  Exner et al. _____ 235—151

OTHER REFERENCES

Farrar, "Automatic Data Handling," The Oil and Gas Journal, February 1957 (pp. 130–132).

MALCOLM A. MORRISON, *Primary Examiner.*

WALTER W. BURNS, JR., *Examiner.*